United States Patent
Williams et al.

(10) Patent No.: US 9,531,798 B2
(45) Date of Patent: Dec. 27, 2016

(54) PANDEMIC REMOTE ACCESS DESIGN

(75) Inventors: Cameron Dean Williams, Denver, CO (US); Eric Oakeson, Golden, CO (US)

(73) Assignee: Virtela Technology Services Incorporated, Greenwood Village, CO (US)

(*) Notice: Subject to any disclaimer, the term of this patent is extended or adjusted under 35 U.S.C. 154(b) by 89 days.

(21) Appl. No.: 12/236,864

(22) Filed: Sep. 24, 2008

(65) Prior Publication Data

US 2009/0094176 A1 Apr. 9, 2009

Related U.S. Application Data

(60) Provisional application No. 60/977,330, filed on Oct. 3, 2007.

(51) Int. Cl.
*G06F 15/16* (2006.01)
*H04L 29/08* (2006.01)
*G06F 9/50* (2006.01)

(52) U.S. Cl.
CPC ......... *H04L 67/1008* (2013.01); *G06F 9/5083* (2013.01); *H04L 67/1002* (2013.01); *H04L 67/1012* (2013.01); *G06F 2209/5011* (2013.01); *G06F 2209/5022* (2013.01)

(58) Field of Classification Search
CPC ............. H04L 67/1008; H04L 67/1002; H04L 67/1012; G06F 9/5083; G06F 2209/5011; G06F 2209/5022
USPC ....................................................... 709/229
See application file for complete search history.

(56) References Cited

U.S. PATENT DOCUMENTS

| 6,763,372 | B1 | 7/2004 | Dani et al. |
| 7,082,521 | B1* | 7/2006 | Nanja ............................... 713/1 |
| 7,716,348 | B1* | 5/2010 | Redding et al. ............... 709/229 |
| 2003/0126202 | A1* | 7/2003 | Watt .............................. 709/203 |
| 2004/0098458 | A1 | 5/2004 | Husain et al. |
| 2004/0210636 | A1 | 10/2004 | Dani et al. |

(Continued)

FOREIGN PATENT DOCUMENTS

| GB | 2421657 A | 6/2006 |
| JP | 1139267 A | 2/1999 |

(Continued)

OTHER PUBLICATIONS

"International Application Serial No. PCT/US2008/11047, Search Report mailed on Nov. 26, 2008", 4 pgs.

(Continued)

*Primary Examiner* — Joseph Greene
(74) *Attorney, Agent, or Firm* — Schwegman Lundberg & Woessner, P.A.

(57) ABSTRACT

In one example embodiment, a system and method is illustrated that includes receiving user count information that includes a user count value and an address identifier. Further, an operation is executed that includes using the user count information to determine whether a limit variable has been exceeded. An operation is executed that removes a member, identified by the address identifier, from a load balancing pool, where the limit variable has been exceed by the user count information. A further operation is shown that includes introducing a device into the load balancing pool, where the user count information is less than or equal to the difference between the limit variable value and a buffer variable.

17 Claims, 14 Drawing Sheets

(56) References Cited

U.S. PATENT DOCUMENTS

| | | | |
|---|---|---|---|
| 2004/0225650 A1* | 11/2004 | Cooper et al. | 707/3 |
| 2005/0063401 A1* | 3/2005 | Kenner et al. | 370/401 |
| 2005/0228856 A1 | 10/2005 | Swildens et al. | |
| 2006/0209688 A1 | 9/2006 | Tsuge et al. | |
| 2006/0218279 A1* | 9/2006 | Yamaguchi et al. | 709/226 |
| 2006/0227705 A1 | 10/2006 | Chandwadkar et al. | |
| 2009/0299791 A1* | 12/2009 | Blake et al. | 705/8 |

FOREIGN PATENT DOCUMENTS

| | | | |
|---|---|---|---|
| JP | 2001117896 A | 4/2001 | |
| JP | 2001273134 A | 10/2001 | |
| JP | 2002163241 A | 6/2002 | |
| JP | 2003323224 A | 11/2003 | |
| JP | 2006178757 A | 7/2006 | |
| JP | 2006227963 A | 8/2006 | |
| WO | WO-2009045298 A1 | 4/2009 | |

OTHER PUBLICATIONS

"International Application Serial No. PCT/US2008/11047, Written Opinion mailed on Nov. 26, 2008", 5 pgs.

"European Application Serial No. 08835352.9, Office Action mailed May 19, 2010", 2 pgs.

"International Application Serial No. PCT/US2008/11047, International Preliminary Report on Patentability mailed Apr. 15, 2010", 8 pgs.

"Japanese Application Serial No. 2010-527946, Office Action mailed Jul. 19, 2012", with English translation of claims, 7 pgs.

"Japanese Application Serial No. 2010-527946, Office Action mailed Dec. 6, 2012", With English Translation, 4 pgs.

"Japanese Application Serial No. 2010-527946, Response filed Oct. 12, 2012 to Office Action mailed Jul. 19, 2012", with English translation of claims, 8 pgs.

"European Application Serial No. 08835352.9, Extended European Search Report mailed Sep. 10, 2014", 7 pgs.

"Japanese Application Serial No. 2013-112742 Response Filed Dec. 3, 2014 to Non-Final Office Action Mailed Jun. 2, 2014", With the English claims, 11 pgs.

"Japanese Application Serial No. 2013-112742, Office Action mailed Jun. 2, 2014", w/English translation, 7 pgs.

"Japanese Application Serial No. 2010-527946, Response filed May 29, 2013 to Non Final Office Action dated Oct. 12, 2012", With English Claims, 5 pgs.

European Application Serial No. 08835352.9 Response filed Jul. 23, 2015 to Extended European Search Report mailed Sep. 10, 2014, With the amended claims, 13 pgs.

Japanese Application Serial No. 2013-112742, Office Action mailed Dec. 17, 2014, W/ English Translation, 4 pgs.

\* cited by examiner

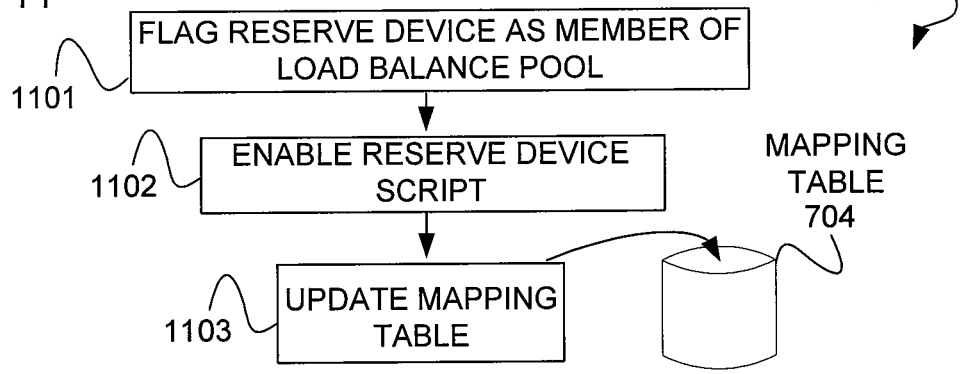
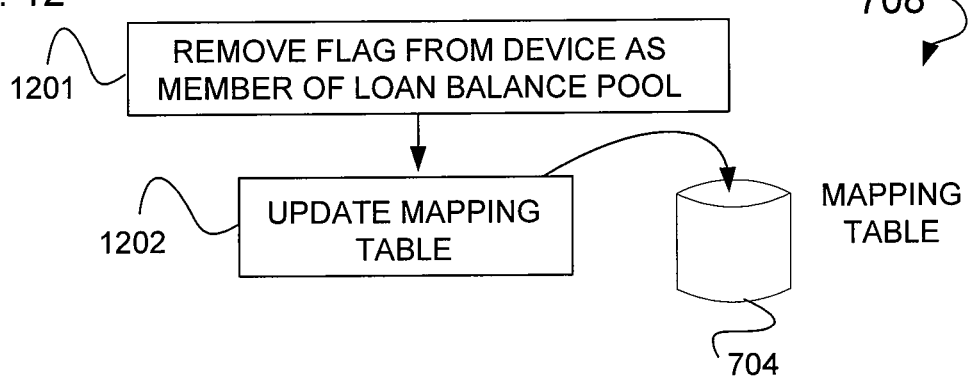
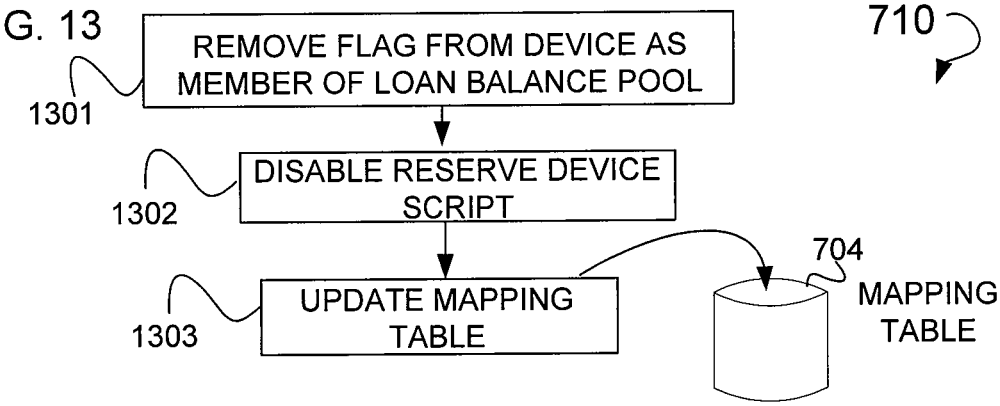
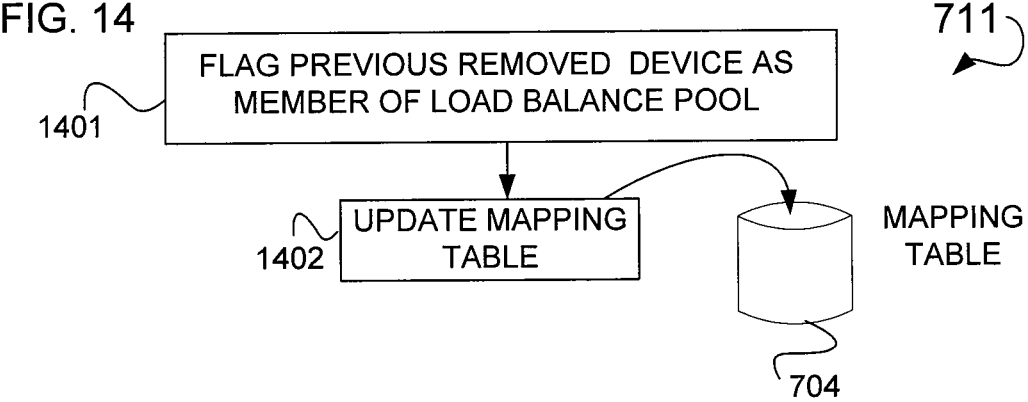

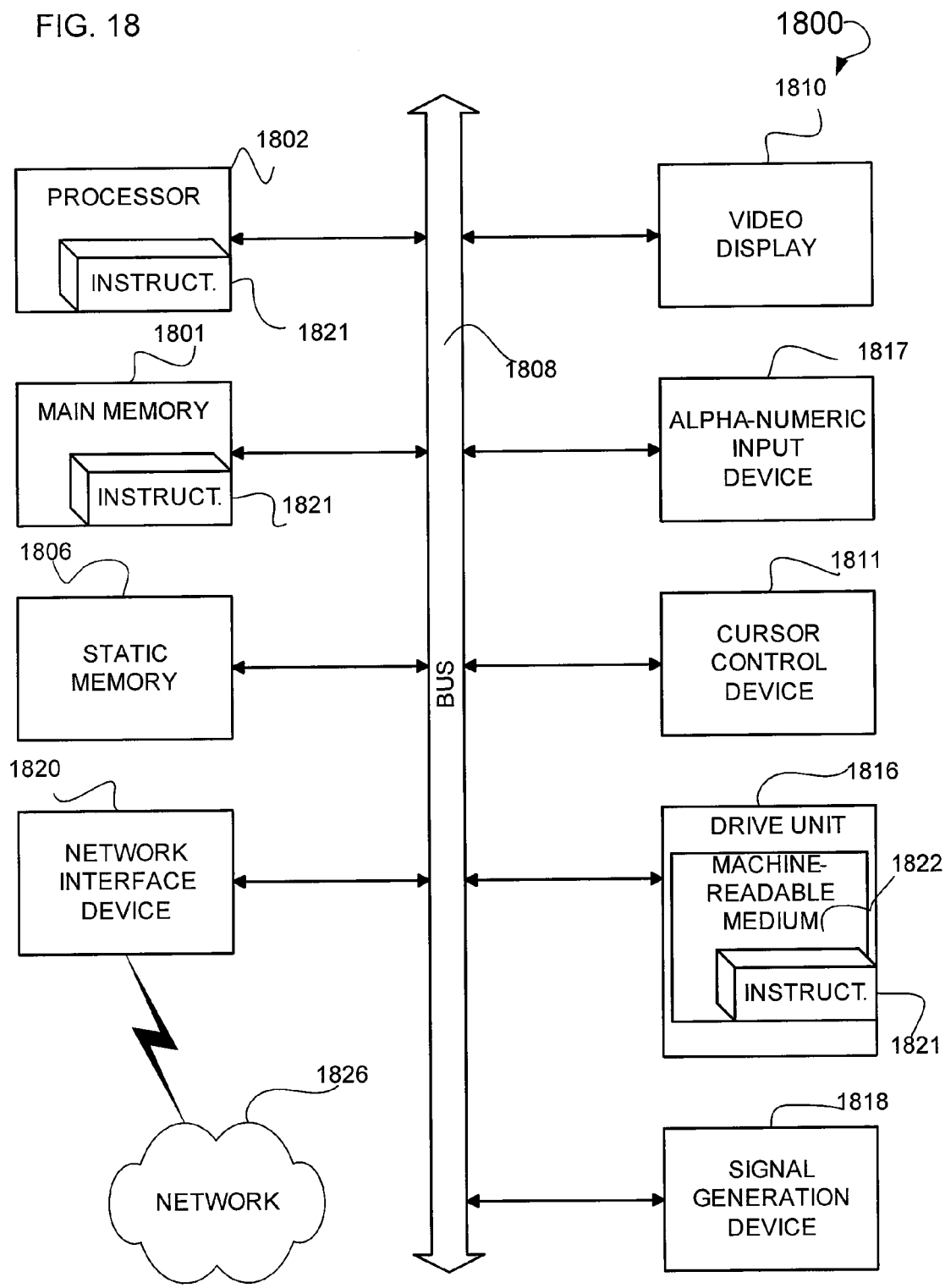

PANDEMIC REMOTE ACCESS DESIGN

CROSS REFERENCE TO RELATED APPLICATIONS

This is a non-provisional patent application claiming priority under 35 USC §119(e) to U.S. Provisional Patent Application No. 60/977,330 filed on Oct. 3, 2007 entitled "PANDEMIC REMOTE ACCESS DESIGN," the content of which is incorporated herein by reference in its entirety.

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that is illustrated below and in the drawings that form a part of this document: Copyright© 2008, Virtela Communications, Incorporated. All Rights Reserved.

TECHNICAL FIELD

The present application relates generally to the technical field of networking and, in one specific example, load balancing.

BACKGROUND

Load balancing appliances allow network traffic to be distributed in, among other things, a uniform manner, or in a manner that takes full advantage of network resources. In certain cases, the capacity of the servers or other suitable devices serviced by these load balancing appliances is exceeded. For example, an excessive number of users being serviced by a particular server may result in the capacity of the particular server being exceeded.

BRIEF DESCRIPTION OF THE DRAWINGS

Some example embodiments are illustrated by way of example and not limitation in the figures of the accompanying drawings in which:

FIG. 11 is a flowchart illustrating a method, according to an example embodiment, used to execute an operation that adds available reserve hardware devices into the load balancing pools as active members.

FIG. 12 is a flowchart illustrating a method, according to an example embodiment, used to execute an operation that may remove various hardware devices from the load balancing pool as members based upon certain licensing restrictions.

FIG. 13 is a flowchart illustrating a method, according to an example embodiment, used to execute an operation that removes a reserve device from being a member of the load balancing pool.

FIG. 14 is a flowchart illustrating a method, according to an example embodiment, used to execute an operation that adds a previously removed device back into the load balancing pool.

FIG. 18 shows a diagrammatic representation of a machine in the form of a computer system, according to an example embodiment.

DETAILED DESCRIPTION

Figure 1:
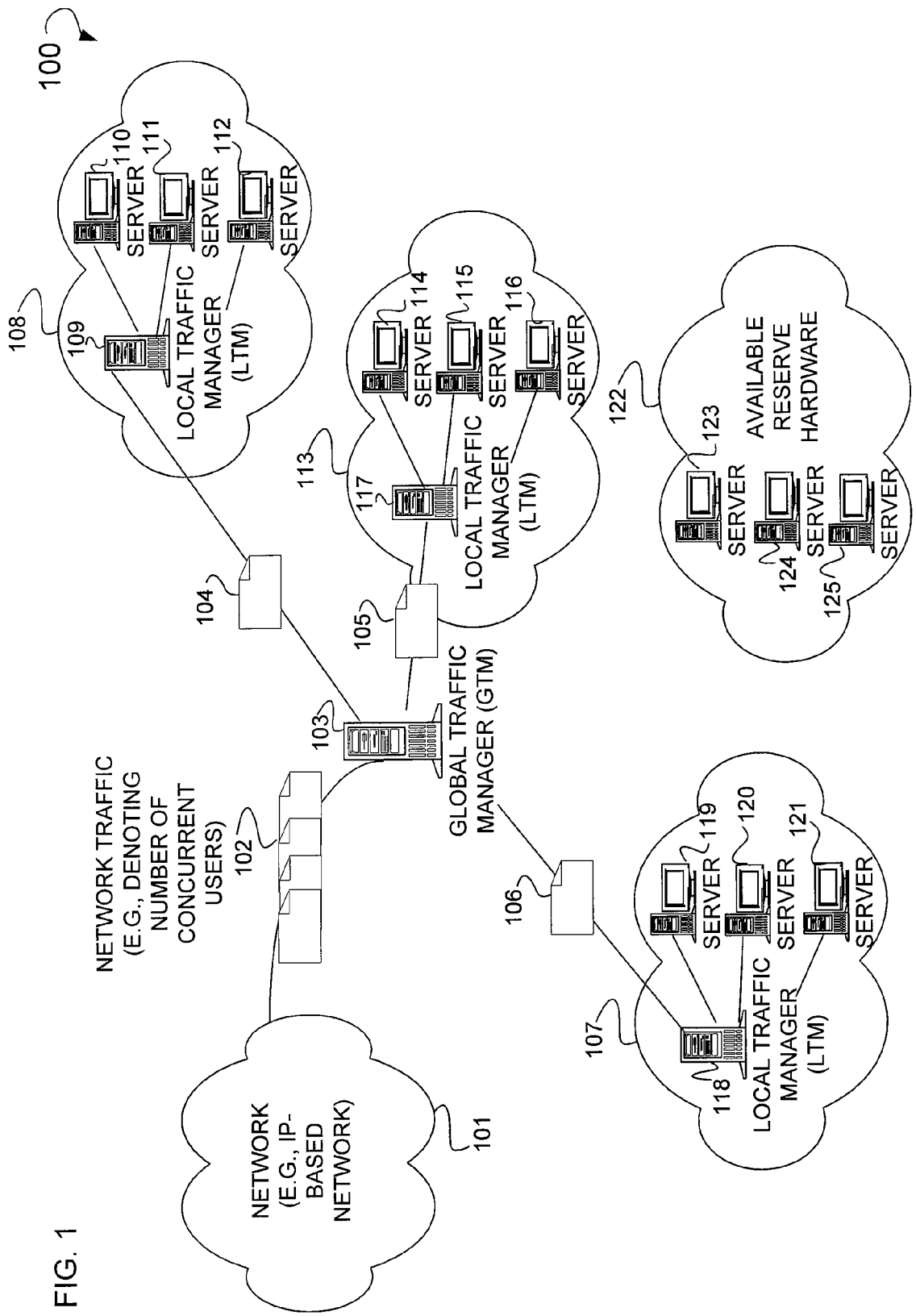
FIG. 1 is a diagram of a system, according to an example embodiment, illustrating the use of a plurality of load balancing appliances within a plurality of network environments.

In one example embodiment, a system and method is illustrated that allows for the dynamic addition or removal of server(s) from a load balancing pool. Some example embodiments may include the use of a Global Traffic Manager (GTM) appliance to balance network traffic between a plurality of LTM appliances. These LTMs may then, in turn, balance the network traffic sent to a plurality of servers, or other suitable devices serviced by a particular LTM. This plurality of server serviced by a particular LTM is a load balancing pool. An LTM may serve a particular domain such as an Autonomous System (AS), area, or other suitable domain. The load balancing pool may exist as part of this domain.

Some example embodiments may include the balancing of the network traffic based upon some type of predefined criteria. In one example embodiment, network traffic is balanced based upon the number of users known by the LTM to be served by any one of the servers to which the LTM is sending network traffic. A user is identified by, for example, a persistent Internet Protocol (IP) address associated with the user. A server may have certain limits (e.g., a limit variable) imposed on it that restricts the number of users that may by served by the server at any one time. These limits are reflective of certain licensing restricts associated with the use of the server as imposed by, for example, a manufacturer of the server. For example, while a server may serve several thousand Transmission Control Protocol (TCP) sessions at once, the server is restricted by the license covering the server to only serve two thousand users at any one time.

In some example embodiments, an available reserve hardware domain may exist to supplement the load balancing pool when the licensing terms relating to the number of user is exceeded or nearly exceeded. This available reserve hardware domain may include a plurality of servers or other suitable devices that are brought into the load balancing pool on an as needed basis. Further, these servers or other suitable devices are removed from the load balancing pool when they are not needed. For example, these servers from the available reserve hardware domain are removed where the number of users served by the servers that make up the load balancing pool is below some threshold value. The servers or other suitable devices that reside as part of the available reserve hardware domain are referenced herein as "dark hardware."

Some example embodiments may include an LTM executing a script that allows the LTM to add servers to the load balancing pool or to remove servers from the load balancing pool. When a server is added, another server is restricted from serving additional users. By restricting this server, the server is effectively removed from the load balancing pool. The server, however, may still be required to service existing users, and, for example, the TCP connections established with the server.

In some example embodiments, the ability of the LTM to make a determination as to whether to remove a server form the load balancing pool, or to add a server to the load balancing pool is based, in part, upon user count data (e.g., a user count value). This user count data is received from the server via a management interface monitored by the LTM. More specifically, the LTM servicing the load balancing pool may send network traffic to the external interface of the server, but may monitor the number of users serviced by the server via the management interface. Some example embodiments may include, the LTM periodically sending a Simple Network Management Protocol (SNMP) based message to the server via the management interface. In response, the server may send a SNMP based reply message including, among other things, the number of users currently being served by the server (e.g., a user count value) and an IP address identifying the management interface. The LTM may then extract the IP address and user count value, and perform a lookup in a mapping table to determine the identity of the external interface associated with the server from which the LTM has received the SNMP based message. Once the identity of the server is determined, the LTM may then determine the limit variable as dictated by a license associated with the server, and remove or add the server to the load balancing pool based upon whether the limit variable has been exceeded or not exceeded.

FIG. 1 is a diagram of example system 100 illustrating the use of a plurality of load balancing appliances within a plurality of network environments. Shown is a network 101, across which network traffic 102 is transmitted to a GTM 103. This network traffic 102 denotes the number of concurrent users of the various domains serviced by the GTM. These domains may include, for example, a domain 107, 108 and 113. Each one of these domains may represent, for example, an AS, an area, or some other suitable domain. Included within each one of these domains is an LTM. An LTM is, for example, the LTM 109 associated with the domain 108, the LTM 118 associated with domain 107, or the LTM 117 associated with the domain 113. Operatively connected to each of one of these LTMs is a plurality of servers. This operative connection is a physical or logical connection. For example, connected to the LTM 118 are a server 119, a server 120, and a server 121. Further, for example, operatively connected to the LTM 109 is a server 110, a server 111 and a server 112. Additionally, operatively connected to the LTM 117 is a server 114, a server 115, and a server 116. The GTM 103 may take network traffic 102 and, in effect, balance the network traffic 102 amongst each of the LTMs 109, 117, and 118. For example, network traffic 104 is received by the LTM 109 and then sent to one or more of the servers 110, 111, or 112. Similarly, network traffic 105 is sent by the GTM 103 to the LTM 117 to be subsequently balanced and sent to the servers 114, 115, or 116. Additionally, network traffic 106 is sent by the GTM 103 to the LTM 118 to be balanced and sent to the servers 119, 120, or 121. Each of the domains 108, 113, and 107 may constitute a load balancing pool. Collectively the domains served by the GTM and associated LTMs may constitute a load balancing pool.

In some example embodiments, a further domain 122 is shown where this domain 122 is an AS, an area, or some other suitable domain. Included within this domain 122 is a plurality of available reserve hardware devices such as, for example, a server 123, a server 124, and a server 125. These servers 123 through 125 is utilized on an as-needed basis to supplement the servers residing in, for example, the domains 107, 108, or 113. These servers 123 though 125 may supplement the other domains though being able to provide additional system resources and capacity to handle the network traffic 102. IP persistence is used as the basis to identify a particular server such that the IP address associated with the management interface for the server is used by the LTM to identify the server. These servers 110 through 112, 114 through 116, and 119 through 121 is Secure Socket Layer (SSL)-Virtual Private Network (VPN) servers (collectively referenced as SSL-VPN servers).

Some example embodiments may include each one of these servers 110 through 112, 114 through 116, and 119 through 121 having certain limitations imposed upon the usage of their resources. These limitations may take the form of, for example, a limitation put on the number of users who may utilize one or more of these servers at any one time. For example, in some embodiments, the servers 110 through 112 included in the domain 108 may at one time only be able to service 7,500 customers as uniquely identified by their persistent IP address. One upshot of this limitation is that the LTM 109 may, for example, only be able to allocate 2,500 users to a particular server. Where this limitation (e.g., a limit variable) on a per server basis is exceeded, then, for example, the available reserve hardware as illustrated in domain 122 (e.g., servers 123 through 125) is brought on line to add additional system resources to the domain 108.

Figure 2:
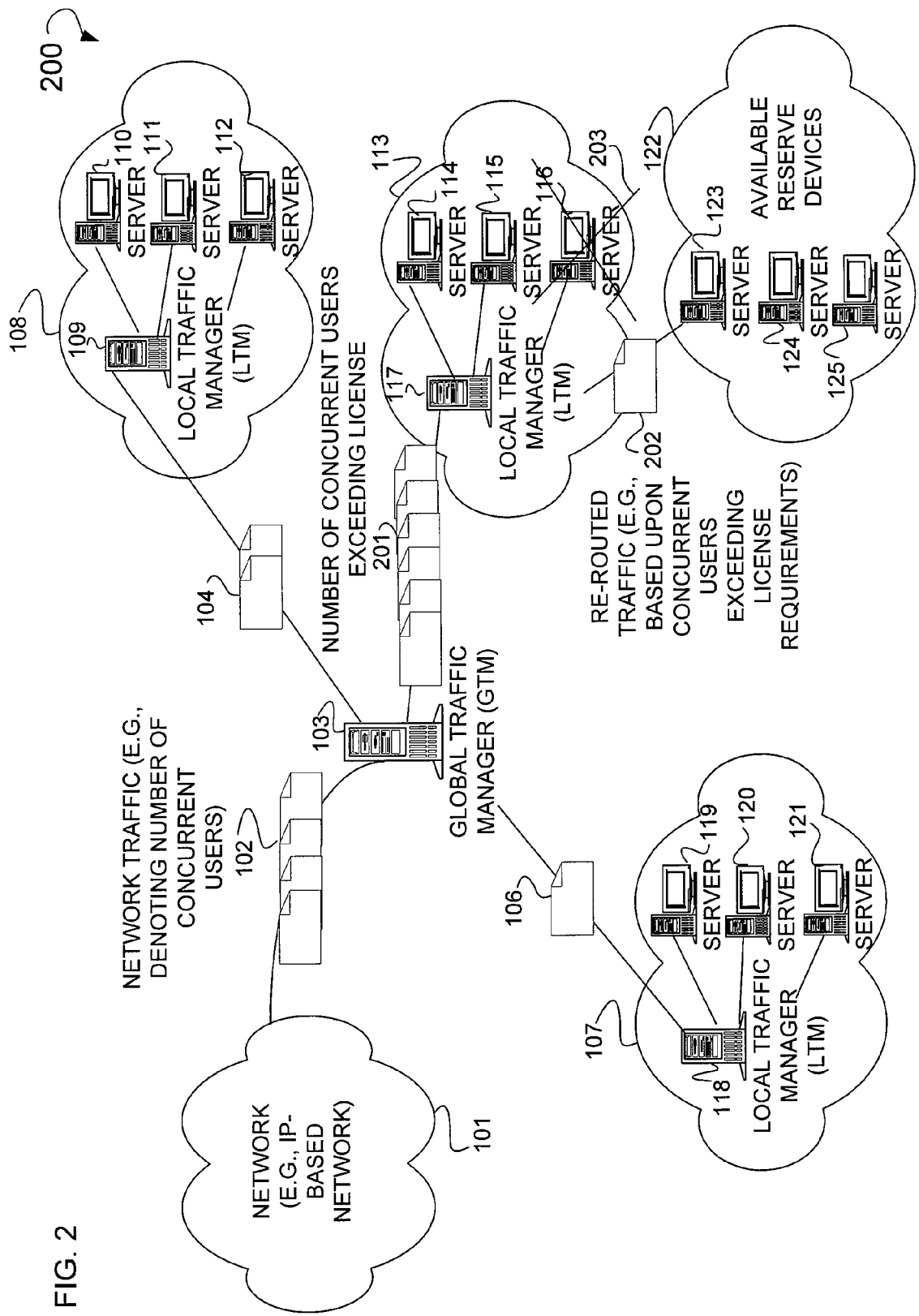
FIG. 2 is a diagram of a system, according to an example embodiment, where domain resources have been exceeded such that additional reserve devices must be utilized.

FIG. 2 is a diagram of example system 200 where domain resources have been exceeded such that available reserve hardware must be utilized. Shown is the GTM 103 that allocates network traffic 201 to the LTM 117 where this network traffic 201 exceeds the licensing restrictions placed on the servers 114 through 116. A license restriction is a memorized legal obligation reflecting limitations of how one might use servers such as servers 114 though 116. For example, as illustrated, the server 116 has exceeded its limitation and hence is taken out of the load balancing pool as denoted at 203. By taking server 116 out of the load balancing pool, server 203 may service no further users.

Additionally, the users that are currently serviced by the server 116 would be allowed to continue using server 116, but no further TCP connections is established between these users and the server 116. Due to the number of users exceeding the license, the server 123 residing as a part of the domain 122 is brought on line and traffic 202 that would otherwise go to the server 116 is re-routed to the server 123.

Figure 3:
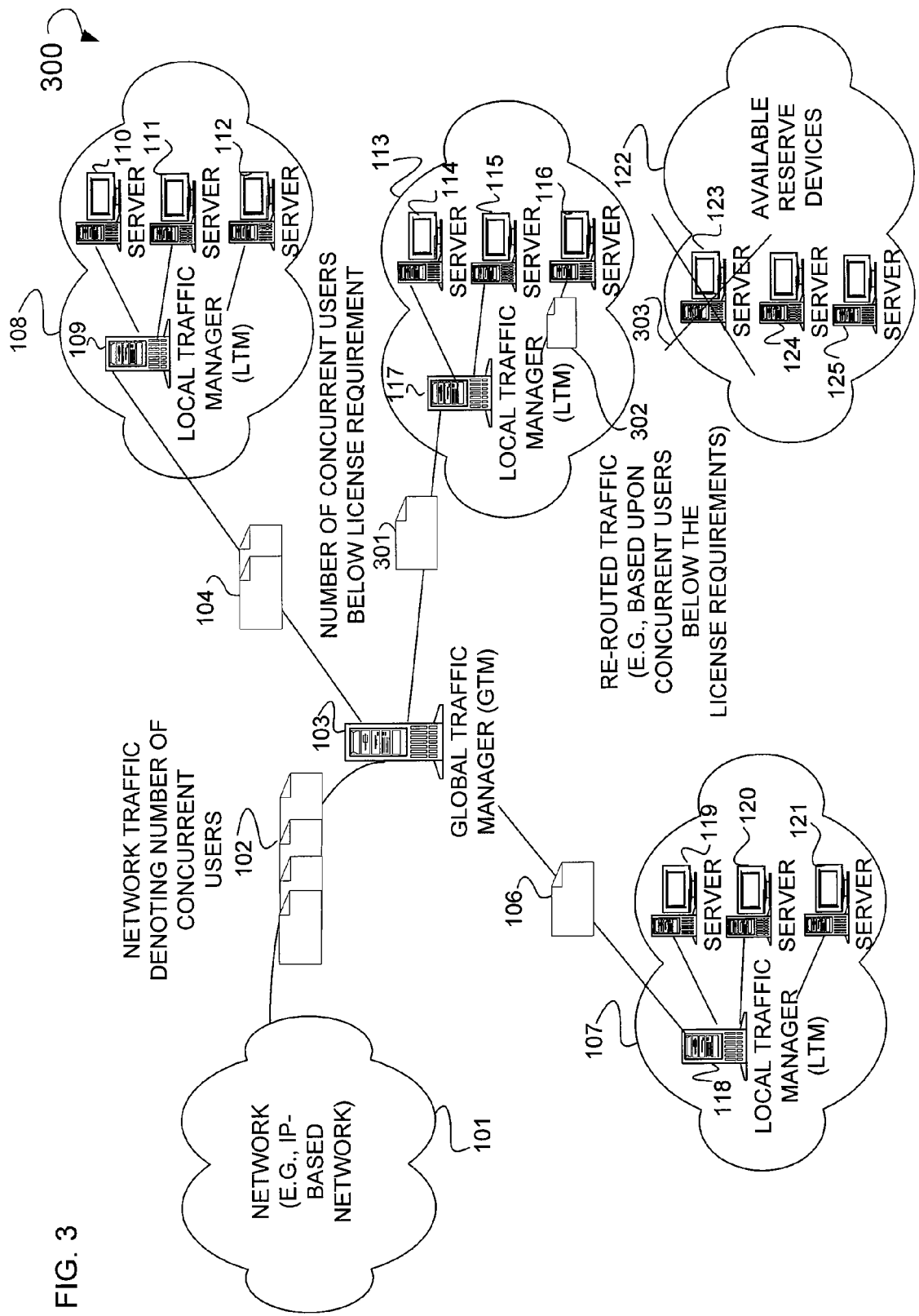
FIG. 3 is a diagram of a system, according to an example embodiment, showing the returning of a server to a load balancing pool and the removal of a reserve hardware device from the load balancing pool.

FIG. 3 is a diagram of example system 300 showing the returning of a server to a load balancing pool and the removal of a reserve hardware device from the load balancing pool. Shown, for example, is network traffic 301 where this network traffic represents a number of concurrent users below some predetermined limit variable as dictated by a licensing restriction. Where the number of concurrent users is below the limit value, a non-reserve hardware device such as server 116 is brought back online to receive network traffic such as network traffic 302. More to the point, network traffic 302 is re-routed from previously utilized server 123 to be processed by the server 116. As with the case when server 116 was taken out of the load balancing pool, the server 123 is allowed to continue to service its concurrent users, but may not be allowed to service additional TCP connections. Further, as illustrated by cross out 303, server 123 is taken out of the load balancing pool when the number of concurrent users is below some predetermined limit variable as dictated by a licensing restriction.

Figure 4:
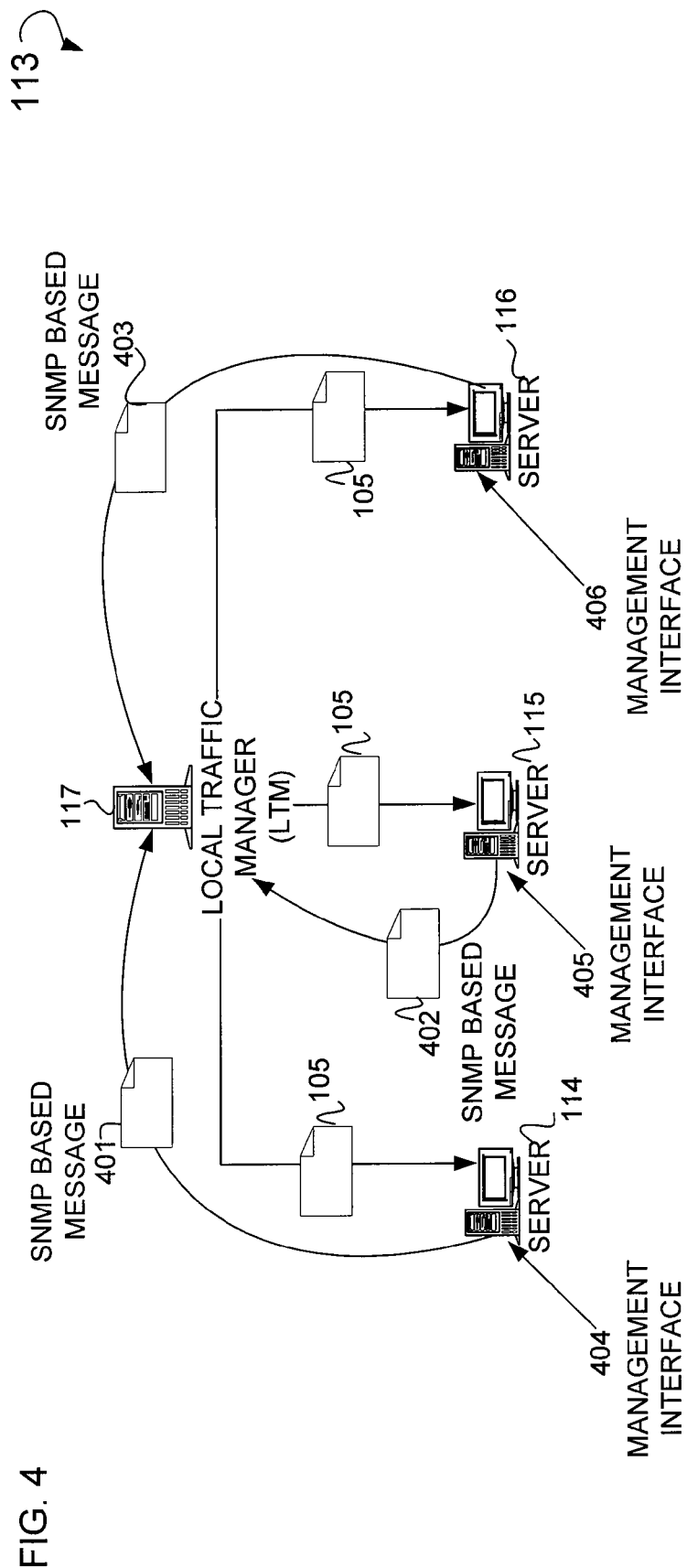
FIG. 4 is diagram of a domain, according to an example embodiment, and computer systems included therein.

FIG. 4 is diagram of the example domain 113 and computer systems included therein. Shown is the previously referenced LTM 117 that may be used to load balance and send network traffic to, for example, the external interfaces for servers 114, 115, or 116. Through these external interfaces, network traffic (such as the previously referenced network traffic 105) is received. In one example embodiment, the LTM 117 may balance the network traffic 105 equally to each of the servers 114, 115, and 116. This traffic is sent via, for example, a physical or logical connection. The server 114 includes a management interface 404. Further, the server 115 may include a management interface 405. Similarly, the server 116 may include a management interface 406. SNMP may, in some example cases, be utilized to send SNMP-based messages to these management interfaces 404 through 406, and to receive messages from these interfaces. For example, SNMP-based messages 401 through 403 is received from the server 114, 115 and 116, and sent to the LTM 117. These SNMP-based messages allow the LTM 117 to monitor network traffic and in particular, the number of concurrent users utilizing any one of the servers 114 through 116. Through monitoring these SNMP-based messages, the LTM 117 may know when the limit variable for each of the servers 114 through 116 has been exceeded. Where this limit variable has been exceeded, available reserve hardware devices, such as servers 123 through 125, is brought online to provide additional network and/or system resources.

Figure 5:
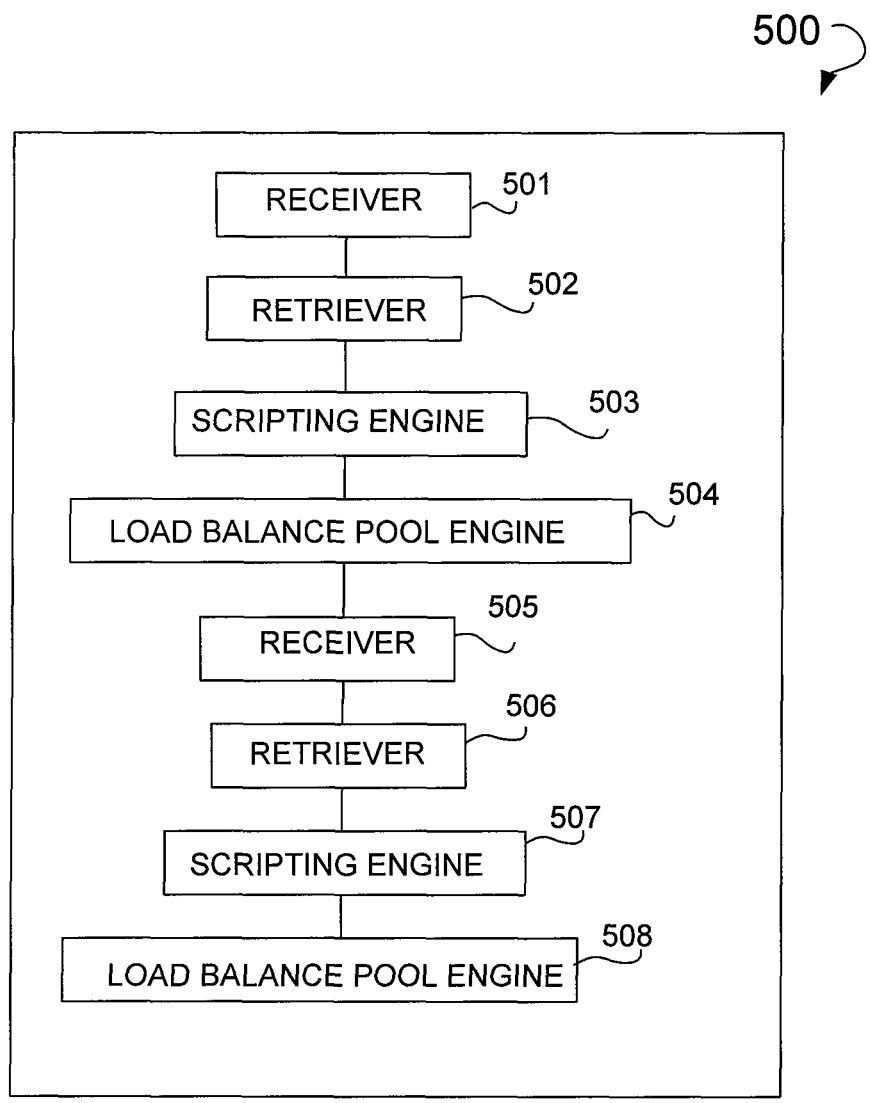
FIG. 5 is a block diagram of a computer system, according to an example embodiment, where this computer system is a Local Traffic Manager (LTM).

FIG. 5 is a block diagram of an example computer system 500, where this computer system 500 is, for example, a LTM such as LTM 117. Shown are a number of blocks 501 through 508 that may reside as part of the computer system 500. These blocks are implemented in hardware, firmware, or software, and are operatively connected via a physical or logical connection. Illustrated is a receiver 501 to receive a script to train the computer system. Also, a retriever 502 is also shown to retrieve a current user count associated with a server. Further, a scripting engine 503 is shown to execute the script to determine whether the current user count exceeds a limit variable described in a license restriction. A load balance pool engine 504 is shown to determine whether to remove the server from the load balance pool, where the current user count exceeds the limit variable. The script is written in a scripting language that includes Perl. Some example embodiments may include, the computer system being a load balancing appliance that includes at least of one an LTM appliance, and a GTM appliance. The server receives network traffic from the load balancing appliance. Some example embodiments may include, the limit variable being a numeric value that includes the number of users that may use the computer system.

In some example embodiments, the computer system 500 may include a receiver 505 to receive a script to train the computer system. Further, it may include a retriever 506 to retrieve a current user count associated with a server. Additionally, a scripting engine 507 is shown to execute the script to determine whether excess capacity exists within a load balancing pool. Additionally, a load balance pool engine 508 is shown to determine whether to re-introduce a server into the load balance pool, where the current user count is less than or equal to a difference between a limit variable and a buffer variable. The computer system 500 is a load balancing appliance that includes at least of one an LTM appliance, and a GTM appliance. Some example embodiments may include the limit variable is a value that includes the number of users that may use the computer system. In some example cases, the buffer variable is a numeric value that is less than the limit variable.

Figure 6:
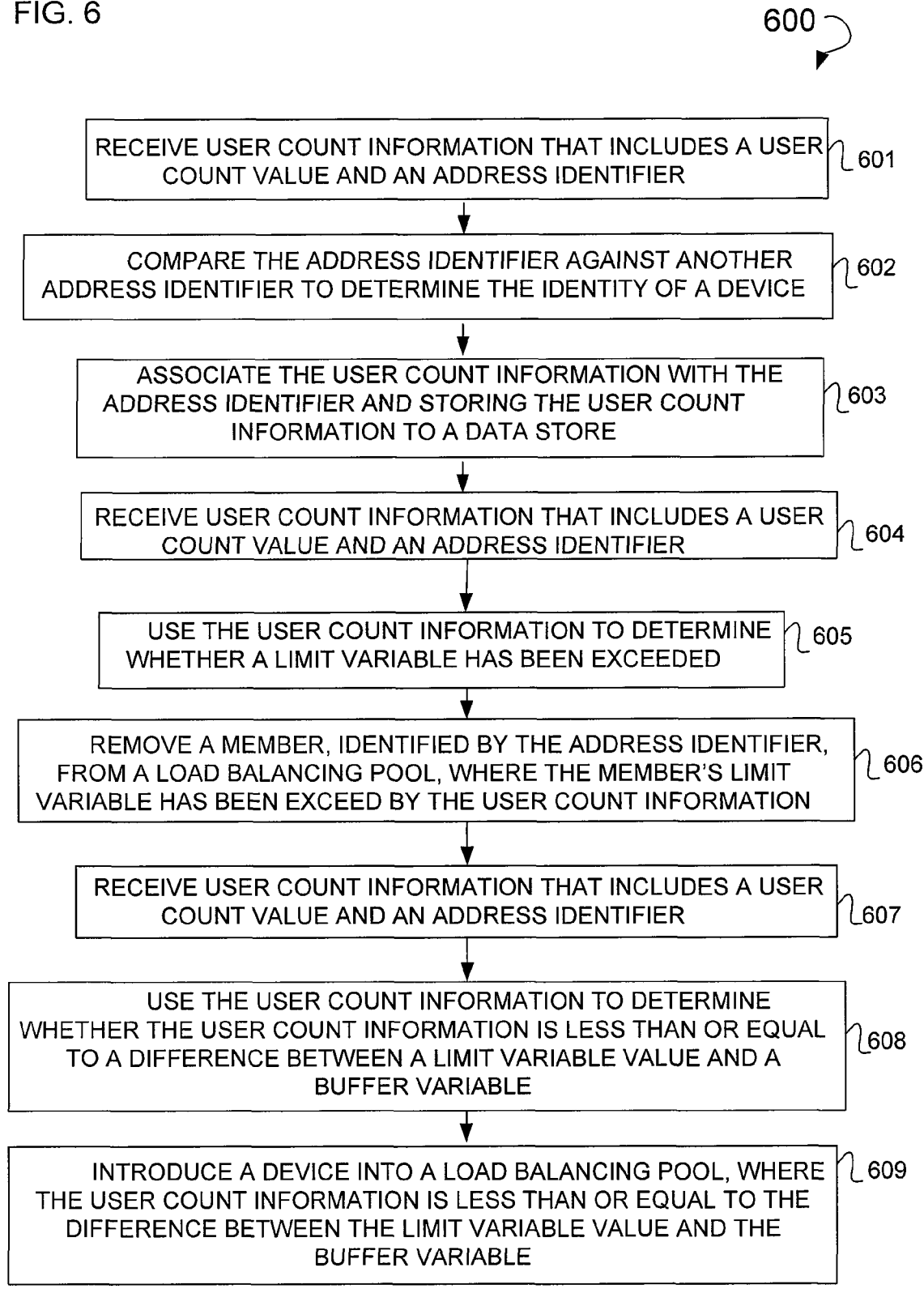
FIG. 6 is a flow chart illustrating a method, according to an example embodiment, used to add or remove hardware devices from a load balancing pool.

FIG. 6 is a flow chart illustrating an example method 600 used to add or remove devices from a load balancing pool. These various operations that make up method 600 may be executed by the LTM 117. Shown is an operation 601 that when executed receives user count information that includes a user count value and an address identifier. An operation 602 is executed to compare the address identifier against another address identifier to determine the identity of a device. Operation 603 is executed to associate the user count information with the address identifier and to store the user count information to a data store. The user count information is the number of users currently using a computer system. Some example embodiments may include, the address identifier being an IP address corresponding to a computer system interface. Moreover, interface includes at least one of a management interface and an external interface. Also, in some example cases, the device is part of a load balance pool.

In some example embodiments, the method 600 may also include an operation 604 that, when executed, receives user count information that includes a user count value and an address identifier. Further, an operation 605 is executed that uses the user count information to determine whether a limit variable has been exceeded. An operation 606 is executed to remove a member, identified by the address identifier, from a load balancing pool, where the member's limit variable has been exceed by the user count information. The limit variable is defined as part of a license restriction covering a server, and reflects the number of users who may use a server. Some example embodiments may include the member as a server. In some example cases, the load balancing pool includes a plurality of servers that receive network traffic from, in part, a load balancing appliance. The user count is numeric value reflecting the number user using a server during a particular period of time.

In some example embodiments, the method 600 includes an operation 607 that when executed receives user count information that includes a user count value and an address identifier. An operation 608 is also shown, that when executed, uses the user count information to determine whether the user count information is less than or equal to a difference between a limit variable value and a buffer variable. Further, an operation 609 is shown that when executed introduces a device into a load balancing pool, where the user count information is less than or equal to the difference between the limit variable value and the buffer variable. The buffer variable is a numeric value, reflecting a number of users, that is less than the limit variable. Some example embodiments may include the limit variable as defined as part of a license restriction covering a server, and reflects a number of users who may use a server. Further, the device is a reserve hardware device that includes a server. Additionally, the load balancing pool includes a plurality of servers that receive network traffic from, in part, a load balancing appliance.

Figure 7:
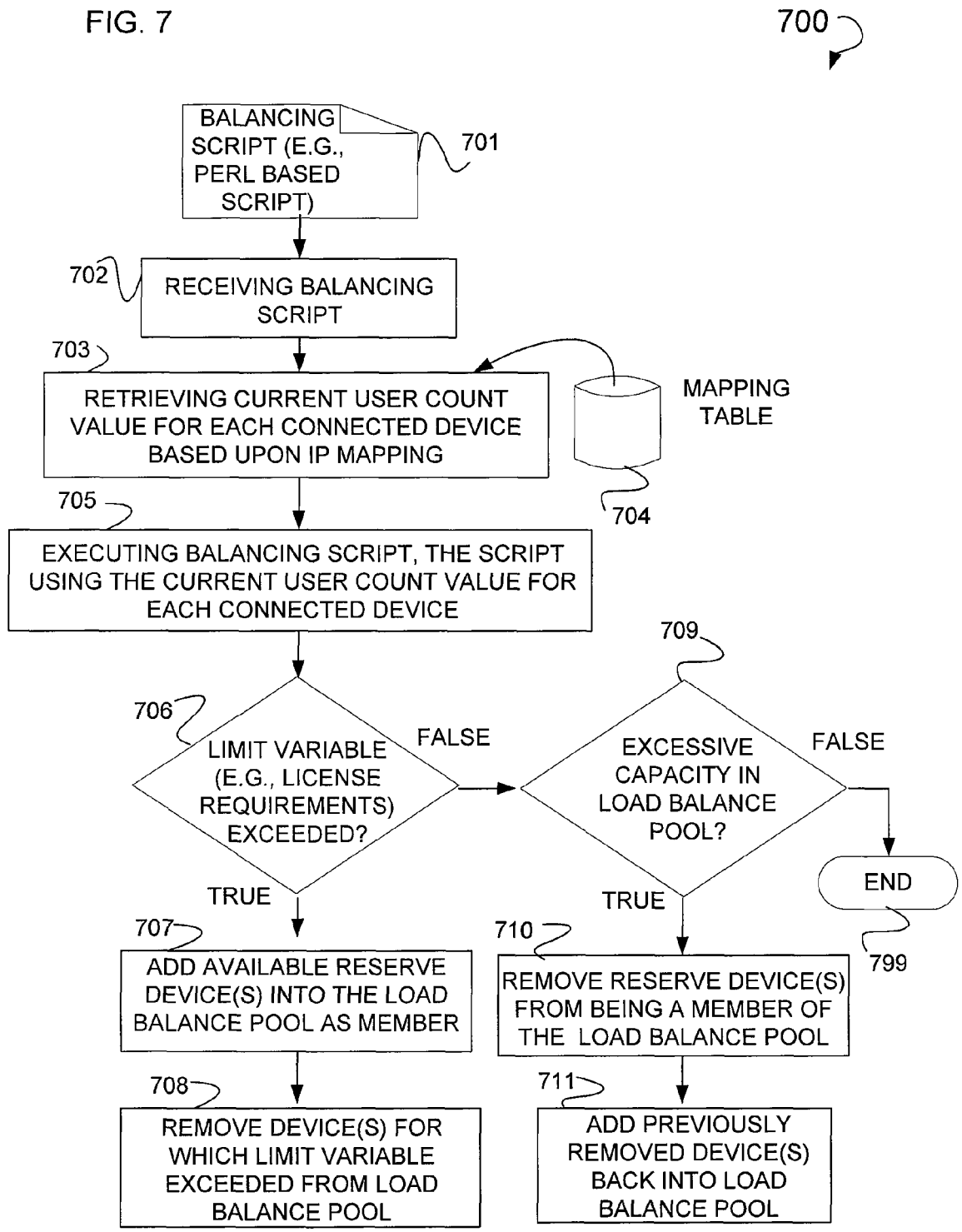
FIG. 7 is a flowchart illustrating a method, according to an example embodiment, implemented on an LTM.

FIG. 7 is a flowchart illustrating an example method 700 implemented on, for example, an LTM such as LTM 117, 118 or 119. Shown is a balancing script 701. This script is written in some type of scripting language such as Perl, Python, Java Script or some other suitable scripting language. This script is received through the execution of operation 702. Operation 703 is executed to retrieve a current user count value and IP addresses for each connected device. A connected device is, for example, the servers 114 through 116. Using IP mapping, the IP address associated with the management interface is mapped to the IP address associated with the external interface for a particular connected device (e.g., server 116). The current user count for this device (e.g., server 116) is then stored into the mapping table 704. An operation 705 is executed that implements the balancing script 701, where the balancing script 701 uses this current user count value for each connected device in instructing the LTM as to whether or not one or more of the available reserve hardware devices 123 through 125 may have to be brought online to provide additional system resources for the purposes of load balancing. In some example embodiments, the script 701 may also instruct the LTM as to what devices may have to be removed from the load balancing tool. A decisional operation 706 is executed, in some example embodiments, to determine whether a limit variable has been exceeded. This limit variable is established by certain licensing restrictions placed upon the number of concurrent users that any one particular connected device (e.g., servers 114 through 116) may service at any one time. In cases where decisional operation 706 evaluates to be "true," an operation 707 is executed that adds available reserve hardware devices into the load balancing pools as active members. An operation 708 is executed that may remove various hardware devices from the balanced pool as members where the limits placed on these hardware devices (e.g., servers 114 through 116) have been exceeded based upon the number of concurrent users. In cases where decisional operation 706 evaluates a "false," a further decisional operation 709 is executed that determines whether or not there is excess capacity in a particular load balance pool. In cases where decisional operation 709 evaluates a "false," termination condition 799 is executed. In cases where decisional operation 709 evaluates a "true," a further operation 710 is executed that removes a reserve device from being a member of the load balancing pool. In some example embodiments, an operation 711 is executed that adds a previously removed device back into the load balancing pool.

Figure 8:
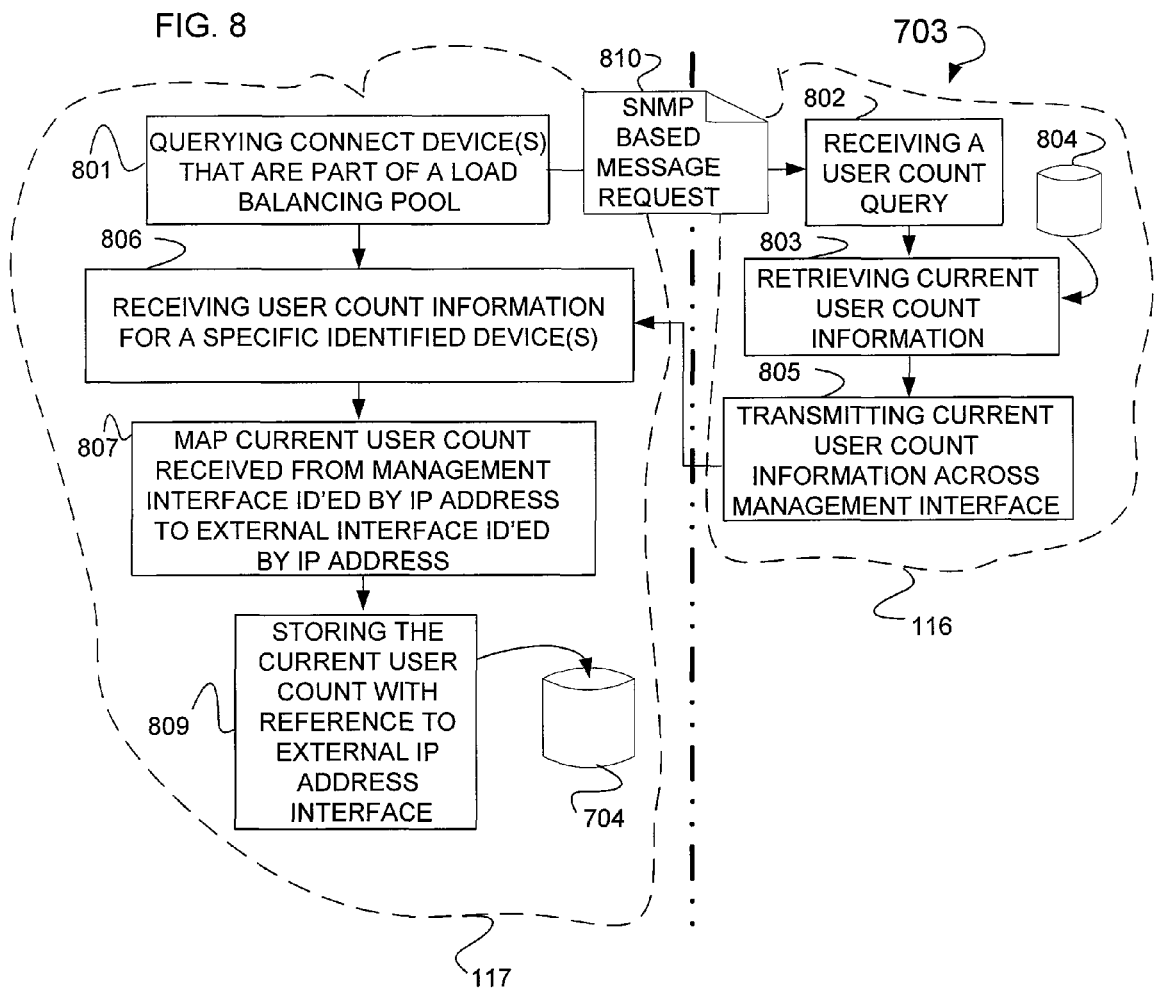
FIG. 8 is a dual stream flowchart illustrating a method, according to an example embodiment, to retrieve a current user count value for each connected device.

FIG. 8 is a dual stream flowchart illustrating an example method 703. Illustrated is a first stream including operations 801, 806, 807, and 809. Also shown as a part of this first stream, is the mapping table 704. In some example embodiments, these operations 801, 806, 807 and 809, and mapping table 704 reside as a part of the LTM 117. Further illustrated, is a second stream including operations 802, 803 and 805, and a current user count table 804. These various operations 802, 803 and 805, and the current user table 804 may, for example, reside as a part of the server 116. An operation 801 is executed that query devices that are a part of a load balancing pool. These devices is, for example, the previously illustrated servers 114 through 116. Operation 802, when executed, receives a user count query in the form of an SNMP based message request 810. Operation 803 maybe executed so as to retrieve current user account information from a current user count table 804. An operation 805 is executed that transmits this current user count information across a management interface such as management interface 406 to be received by the LTM 117. Some example embodiments may include an operation 806 that is executed to receive an SNMP based message that includes user count information and that identifies the IP address associated with the management interface and connected device (e.g., server 116). An operation 807 is executed, to parse out an IP address associated with the management interface from the SNMP based message. This same operation 807 may also, in some example embodiments, parse out the user count information. Further, this operation 807 may then map the IP address associated with the management interface to an IP address associated with the external interface for a device such as server 116. Once mapped, an operation 809 is executed to that stores the user count value for a particular device such as server 116 into the mapping table 704.

Figure 9:
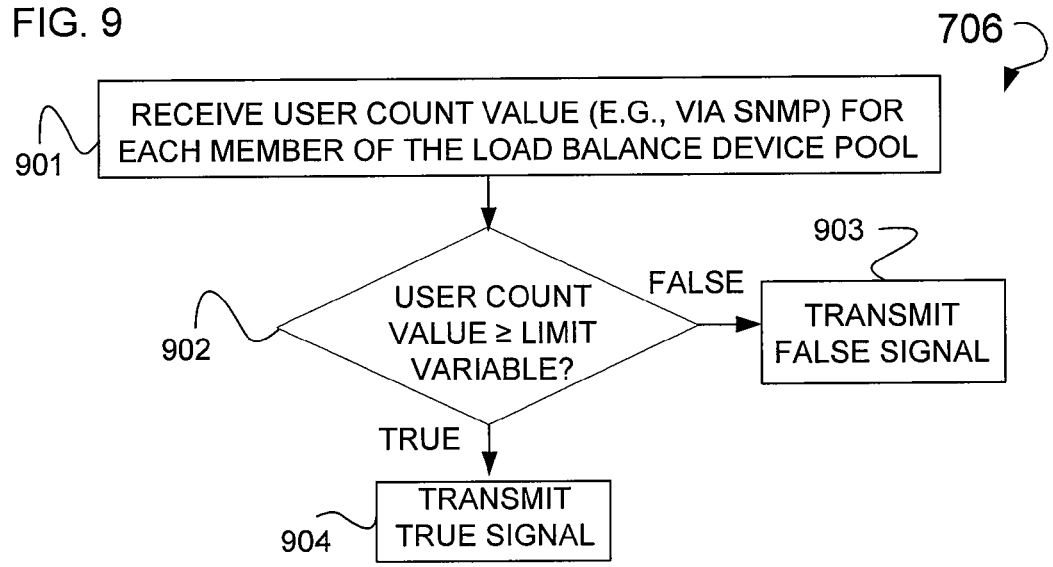
FIG. 9 is a flowchart illustrating a method, according to an example embodiment, used to an execute operation to determine whether a limit variable has been exceeded.

FIG. 9 is a flowchart illustrating an example method used to execute operation 706. Shown is an operation 901 that receives a user count value from, for example, an SNMP-based message (see e.g., SNMP base messages 401 through 403). A decisional operation 902 maybe executed that determines whether the user count value is greater than or equal to a limit variable defining the concurrent user licensing restriction for a particular server, such as server 116. Cases where decisional operation 902 valuates to "false," an operation 903 is executed that transmits a false signal. Cases where decision operation 902 valuates to "true," an operation 904 is executed that transmits a true signal.

Figure 10:
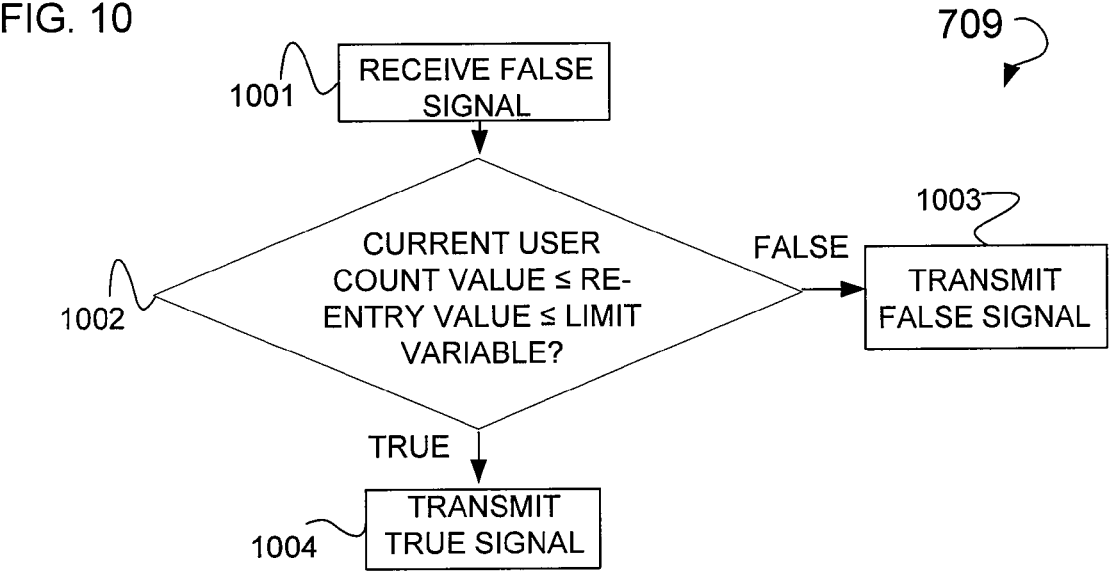
FIG. 10 is a flowchart illustrating a method, according to an example embodiment, use to execute an operation that determines whether or not there is excess capacity in a particular load balance pool.

FIG. 10 is a flowchart illustrating an example method use to execute operation 709. Shown is an operation 1001 that, when executed, receives a false signal. A decisional operation 1002 is executed that determines whether the current user count value is less than or equal to a re-entry value which, in turn, must be less than or equal to the limit variable. In some example embodiments, the re-entry value is based upon the difference between the limit variable and a manually defined buffer value. This manually defined buffer value is defined by a network administrator or other suitable person during configuration of the LTM. The re-entry value is used to ensure that a device does not continuously fall into and out of the load balancing pool due to network traffic hovering around the limit variable value. In some example embodiments, the current user count value is the number of users concurrently utilizing a particular device such as the server 114. The re-entry value is some type of pre-determined value used to denote when a device such as server 116 may re-enter the load balancing pool. The cases where decisional operation 1002 evaluates to "false," a further operation 1003 may execute that transmits a false signal. Cases where decisional operation 1002 evaluates to "true," a further operation 1004 is executed that transmits a true signal.

FIG. 11 is a flowchart illustrating an example method used to execute operation 707. Shown is an operation 1101 that flags a reserve device or devices as a member of a load balancing pool. Operation 1102, when executed, enables the script associated with a reserve device such as the servers 123 through 125. This script allows the reserve device to begin to service users. An operation 1103 is executed that updates a mapping table such as mapping table 704, with information stating that a particular device, such as server 116, is actually a member of the load balancing pool.

FIG. 12 is a flowchart illustrating an example method used to execute operation 708. Shown is an operation 1201 that removes a flag value in the mapping table 709 relating to a device, where the removal of the flag denotes that a member of the load balancing pool is no longer a member. In some example embodiments, this flag value is a boolean value. In some example embodiments, an operation 1202 is executed that updates the mapping table 704, with the removal of the flag such that it is denoted in the mapping table 704 that the particular device is no longer part of the load balancing pool.

FIG. 13 is a flowchart illustrating an example method used to execute operation 710. Shown as an operation 1301 that removes a flag from a device as a member of a load balancing pool. Operation 1302 is implemented so as to disable a script used to execute one of the reserve devices such as servers 123 through 125. Operation 1303 is executed that updates the mapping table 704 with information to the effect that the device, whose script has been disabled, is no longer a member of the load balancing pool.

FIG. 14 is a flowchart illustrating an example method used to execute operation 711. Shown is an operation 1401 that flags in the mapping table 704 that a device previously removed from a load balancing pool, may again become a member of the load balancing pool. An operation 1402 may, in some example embodiments, be executed to update the mapping table 704 to the effect that the previously removed device is again a member of a load balancing pool such that it can now receive network traffic.

Figure 15:
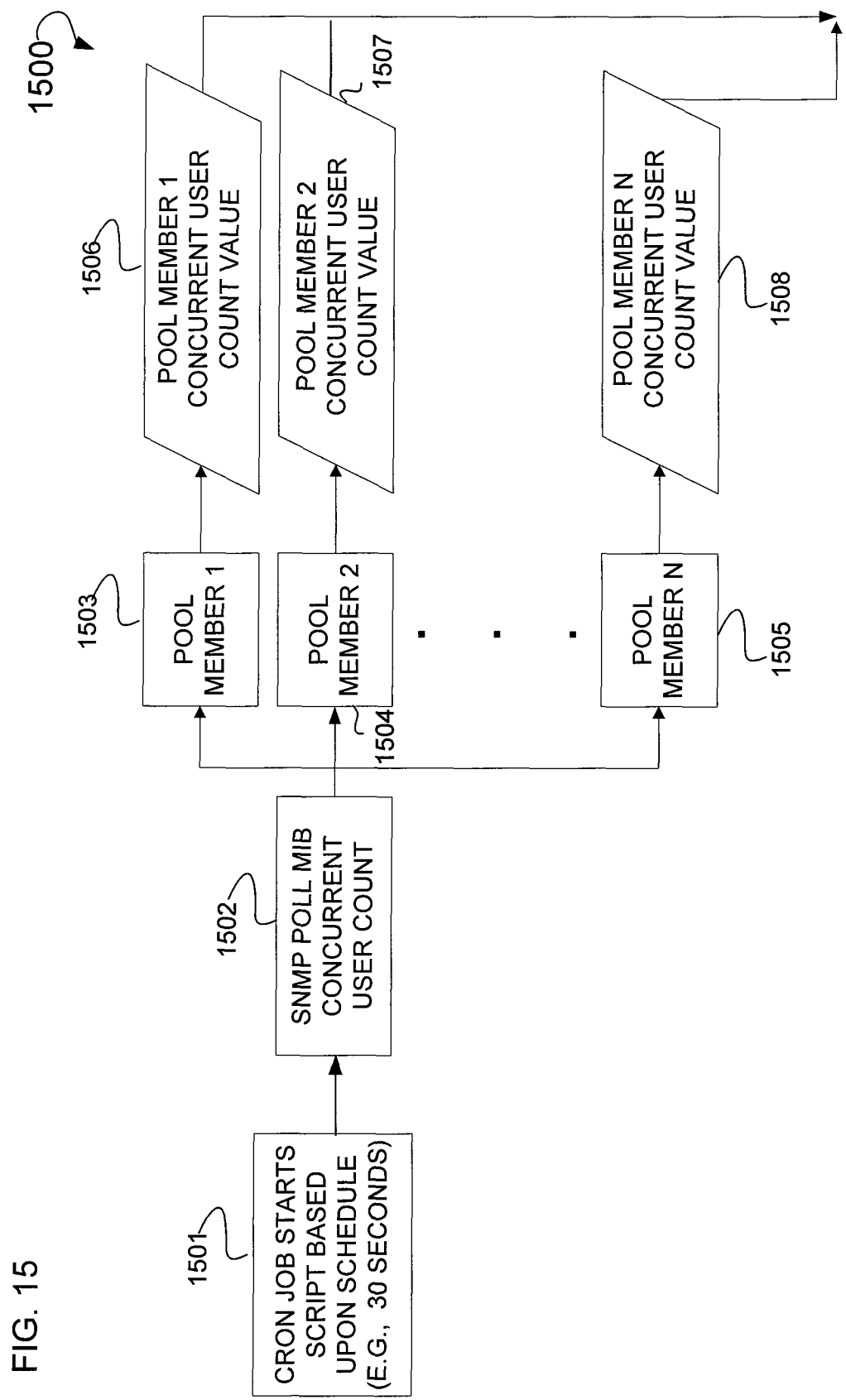
FIG. 15 is a flowchart illustrating a method, according to an example embodiment, used to determine whether or not a device should be removed from a load balancing pool.

FIG. 15 is a flowchart illustrating an example method 1500 used to determine whether or not a device should be a member of a load balancing pool or whether it should be removed from the load balancing pool. Illustrated is a plurality of operations 1501 through 1505, and data descriptions 1506 through 1508. These various operations may be executed by the LTM 117. Shown is an operation 1501 wherein a chronological job (e.g., Cron Job) starts (e.g., executes) a script based upon some pre-determined schedule. In some example embodiments, the balancing script 701 is executed based upon some pre-determined schedule such that it is executed every 30 seconds, 60 seconds, 90 seconds, or at some other suitable time interval. An operation 1502 is executed that conducts an SNMP poll to determine the concurrent user count for a particular device such as servers 114 through 116, that is connected to the LTM 117. For example, illustrated is a pool member number 1 1503, a pool member number 2 1504 and a pool member number N 1505. Generated by each of these pool members 1503 through 1505 is data in the form of data 1506 through 1508 where, for example, data 1506 is a concurrent user account value for a pool member number 1 1503. Further, data 1507 is a concurrent user account value 1507 for pool member number 2 1504. Additionally, data 1508 is a concurrent user account value for pool member number N 1505. As will be more fully described below, these various data values 1506 through 1508 is processed to make a determination as to whether or not a limit variable has been exceeded.

Figure 16:
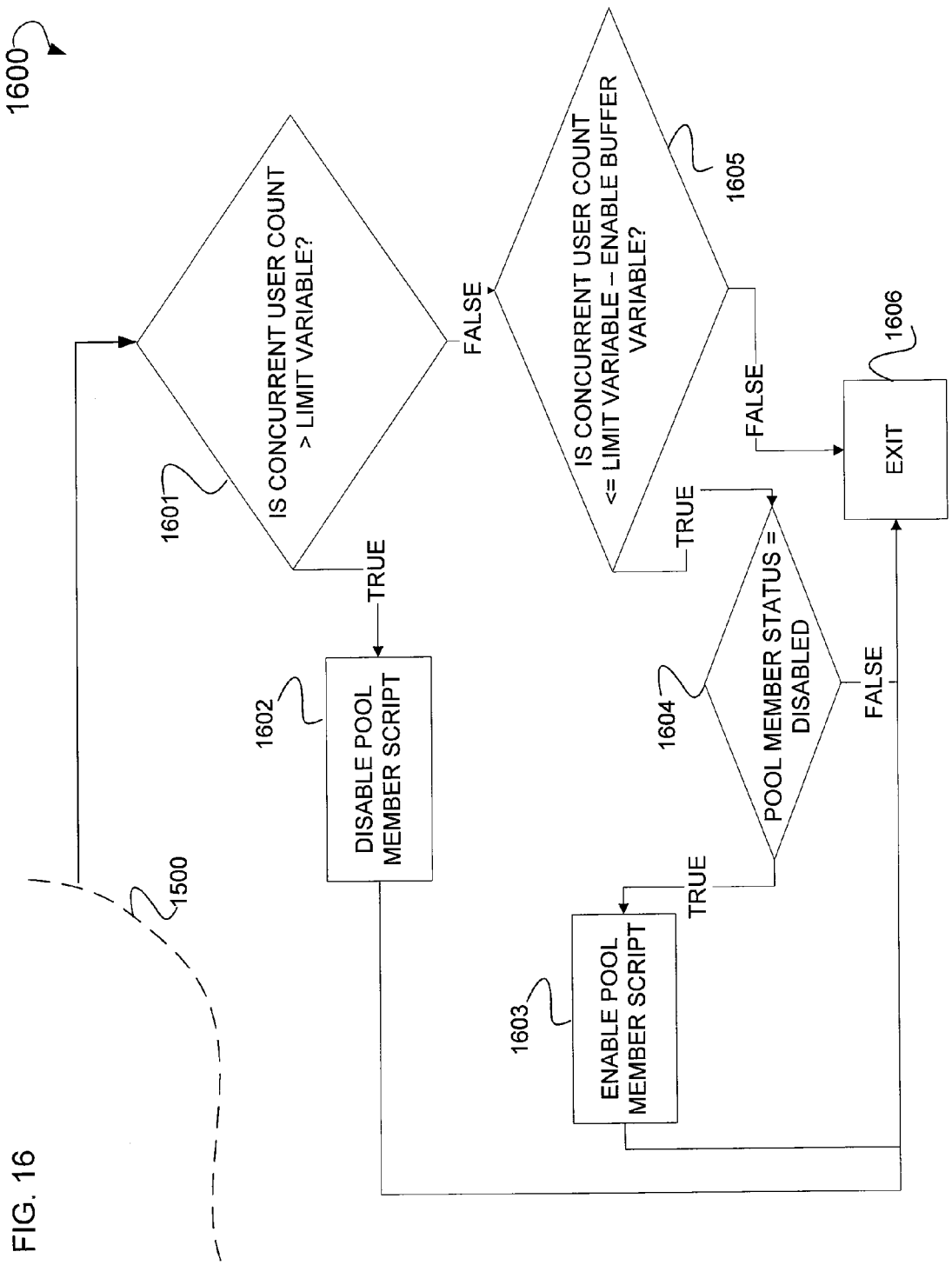
FIG. 16 is a flowchart illustrating a method, according to an example embodiment, used to determine whether or not a particular device should be removed from the load balancing pool.

FIG. 16 is a flowchart illustrating an example method 1600 used to determine whether or not a particular device, such as, for example, servers 114 though 116, should be removed from the load balancing pool and additional available reserve hardware devices (e.g., servers 123 to 125) should be introduced into the load balancing pool. Illustrated are various operations 1601 through 1606 that may be executed by, for example, the LTM 117. Shown is the decisional operation 1601 that determines whether or not a current user account value exceeds a limit variable or this limit variable. In cases where decisional operation 1601 evaluates to "true," an operation 1602 is executed, which disables the pool member's script such that the pool member may no longer receive additional users. The pool member may, however, continue to service the various TCP connections that exist between the pool member and the various users and computer systems utilized by the users. An operation 1606 may then be executed that serves as a termination condition.

In example cases where decisional operation 1601 evaluates to "false," a further decisional operation 1605 is executed. This decisional operation 1605 may determine, for example, whether the current user count value is less than or equal to the difference between a limit variable and an enabled buffer variable. In some example embodiments, the limit variable is a restriction imposed by a particular license on the number of concurrent users serviced by a particular device such as, for example, servers 114 to 116. In some example embodiments, the enabled buffer variable is some type of variable determined by, for example, a network administrator that denotes the amount of free space that may exist within a buffer utilized by, for example, the servers 114 to 116 to handle new concurrent users and the associated TCP connections generated by these users. In cases where decisional operation 1605 evaluates to "true," a further decisional operation 1604 is executed. In some example embodiments, decisional operation 1604 may determine the status of a pool member. In cases where decisional operation 1604 evaluates to "true," and the status of a pool member is determined to be disabled, an operation 1603 maybe executed. The operation 1603, when executed, may enable the previously disabled pool members to become active and is enable them handle additional concurrent users and their associated TCP connections. Cases where decisional operation 1604 evaluates to "false," then the previously referenced operation 1606 is executed. In cases where decisional operation 1605 evaluates to "false," then again the previously referenced 1606 is executed.

Figure 17:
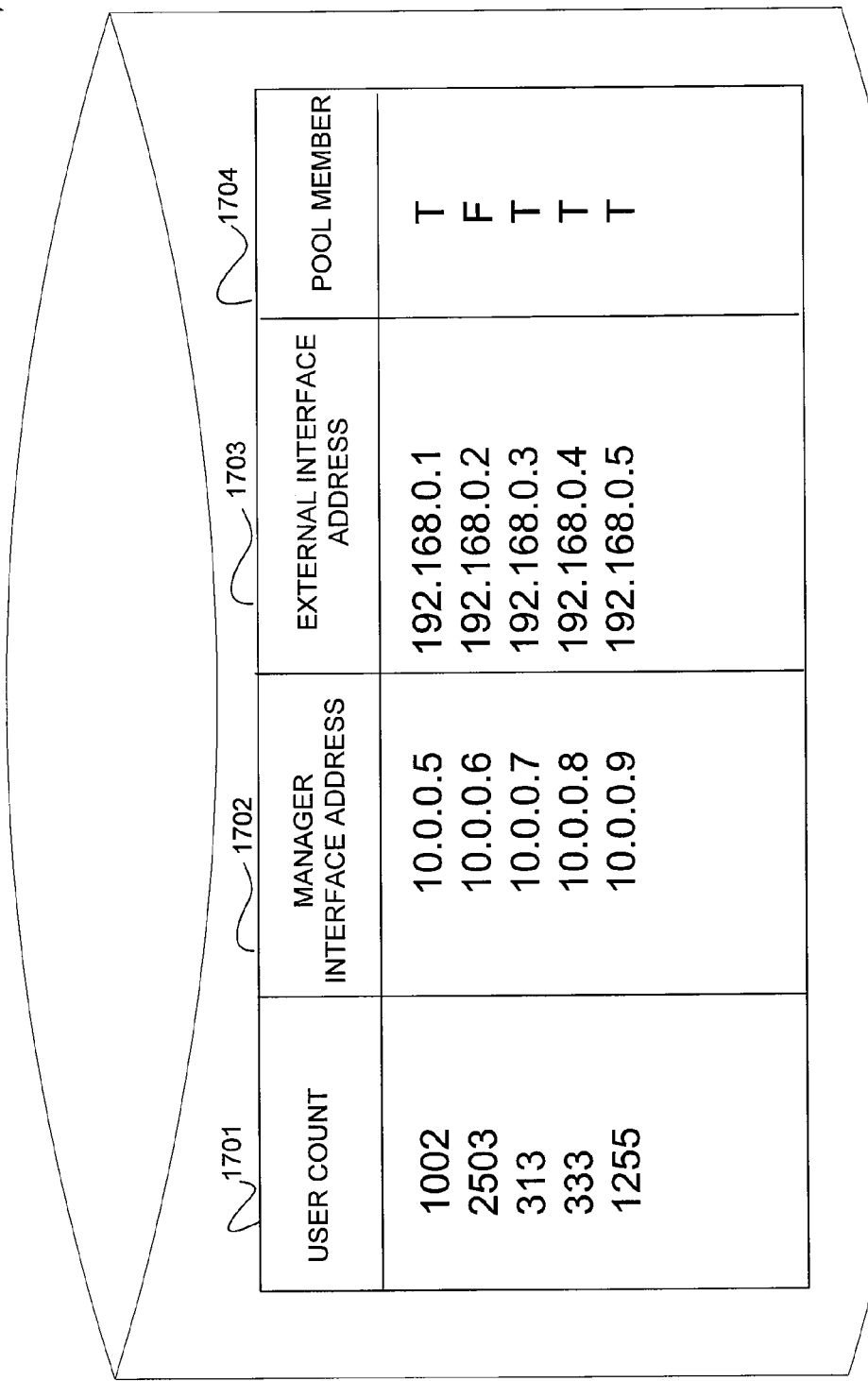
FIG. 17 is a diagram of a table, according to an example embodiment, that is included within a mapping table.

FIG. 17 is a diagram of a various table that is included within, for example, the mapping table 704. Shown, for example, is a mapping table residing as a part of the mapping table 704 that includes a number of columns. These columns include, for example, a user count column 1701, a manager interface address column 1702, an external interface address column 1703, and a member of pool column 1704. With regard to the user count column 1701, the user counts for particular devices are shown. These user counts are the number of concurrent users for a particular device, where this device is identified by its persistent IP address. These devices include, for example, the servers 114 through 116. With regard to the column 1702, a number of management interface IP addresses are shown. Where these management interface addresses is, for example, persistent IP addresses. Also shown within the column 1703 are additional persistent IP addresses, but here representing the external interface addresses for certain devices. Also shown, within the column 1704, are flags for pool members denoting whether or not a particular device such as the servers 114 to 116 are members of a load balancing pool. In example cases where the concurrent user count value exceeds the limit variable value, as dictated by a licensing restriction, then the boolean value included within the pool member column 1704 is set to "false." Specifically, where the value included in column 704 is set to "false" the devices such as the servers 114 to 116, may no longer be considered as a member of the pool and hence may no longer be sent network traffic such as, for example, network traffic 105, 104, or 106. However, in cases where the users count value is below the limit variable value as dictated by a licensing restriction, the boolean value included within the pool member column 1704 is set to "true" denoting that that device (e.g., servers 114 to 116), is able to receive network traffic.

A Three-Tier Architecture

In some example embodiments, a method is illustrated as implemented in a distributed or non-distributed software application designed under a three-tier architecture paradigm, whereby the various components of computer code that implement this method is categorized as belonging to one or more of these three tiers. Some example embodiments may include a first tier as an interface (e.g., an interface tier) that is relatively free of application processing. Further, a second tier is a logic tier that performs application processing in the form of logical/mathematical manipulations of data inputted through the interface level, and communicates the results of these logical/mathematical manipulations to the interface tier, and/or to a backend or storage tier. These logical/mathematical manipulations may relate to certain business rules or processes that govern the software application as a whole. A third storage tier is a persistent storage medium or non-persistent storage medium. In some example cases, one or more of these tiers is collapsed into another, resulting in a two-tier architecture or even a one-tier architecture. For example, the interface and logic tiers is consolidated, or the logic and storage tiers is consolidated, as in the case of a software application with an embedded database. This three-tier architecture is implemented using one technology, or, as will be discussed below, a variety of technologies. This three-tier architecture, and the technologies through which it is implemented, is executed on two or more computer systems organized in a server-client, peer-to-peer, or so some other suitable configuration. Further, these three tiers is distributed between more than one computer system as various software components.

Component Design

Some example embodiments may include the above illustrated tiers, and the processes or operations that make them up, as being written as one or more software components. Common to many of these components is the ability to generate, use, and manipulate data. These components, and the functionality associated with each, is used by client, server, or peer computer systems. These various components is implemented by a computer system on an as-needed basis. These components is written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components is linked to other components via various Application Programming interfaces (APIs), and then compiled into one complete server, client, and/or peer software application. Further, these APIs is able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system including a logic component (e.g., a logic tier). These first and second computer systems is configured in a server-client, peer-to-peer, or some other suitable configuration. These various components is written using the above illustrated object-oriented programming techniques, and can be written in the same programming language or a different programming language. Various protocols is implemented to enable these various components to communicate regardless of the programming language used to write these components. For example, a component written in C++ is able to communicate with another component written in the Java programming language using a distributed computing protocol such as a Common Object Request Broker Architecture (CORBA), a Simple Object Access Protocol (SOAP), or some other suitable protocol. Some example embodiments may include the use of one or more of these protocols with the various protocols outlined in the Open Systems Interconnection (OSI) basic reference model or Transmission Control Protocol/Internet Protocol (TCP/IP) protocol stack model for defining the protocols used by a network to transmit data.

A System of Transmission Between a Server and Client

Some example embodiments may use the OSI basic reference model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also includes port information for a recipient software application residing remotely. This TCP segment is loaded into the data load field of an IP datagram residing at the network layer. Next, this IP datagram is loaded into a frame residing at the data link layer. This frame is then encoded at the physical layer and the data transmitted over a network such as the Internet, Local Area Network (LAN), Wide Area Network (WAN), or some other suitable network. In some example cases, Internet refers to a network of networks. These networks may use a variety of protocols for the exchange of data, including the aforementioned TCP/IP, and additionally ATM, SNA, SDI, or some other suitable protocol. These networks is organized within a variety of topologies (e.g., a star topology) or structures.

A Computer System

FIG. 18 shows a diagrammatic representation of a machine in the example form of a computer system 1800 within which a set of instructions for causing the machine to perform any one or more of the methodologies discussed herein is executed. In alternative embodiments, the machine operates as a standalone device or is connected (e.g., networked) to other machines. In a networked deployment, the machine may operate in the capacity of a server or a client machine in server-client network environment, or as a peer machine in a peer-to-peer (or distributed) network environment. The machine is a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, perform tasks. In a distributed system environment, program modules are located in both local and remote memory-storage devices (see below).

The example computer system 1800 includes a processor 1802 (e.g., a Central Processing Unit (CPU), a Graphics Processing Unit (GPU) or both), a main memory 1801 and a static memory 1806, which communicate with each other via a bus 1808. The computer system 1800 may further include a video display unit 1810 (e.g., a Liquid Crystal Display (LCD) or a Cathode Ray Tube (CRT)). The computer system 1800 also includes an alphanumeric input device 1817 (e.g., a keyboard), a User Interface (UI) cursor controller 1811 (e.g., a mouse), a disc drive unit 1816, a signal generation device 1818 (e.g., a speaker) and a network interface device (e.g., a transmitter) 1820.

The disc drive unit 1816 includes a machine-readable medium 1822 on which is stored one or more sets of instructions and data structures (e.g., software) embodying or utilized by any one or more of the methodologies or functions illustrated herein. The software may also reside, completely or at least partially, within the main memory 1801 and/or within the processor 1802 during execution thereof by the computer system 1800, the main memory 1801 and the processor 1802 also constituting machine-readable media.

The instructions 1821 may further be transmitted or received over a network 1826 via the network interface device 1823 using any one of a number of well-known transfer protocols (e.g., Hyper Text Transfer Protocol (HTTP), Session Initiation Protocol (SIP)).

In some example embodiments, a removable physical storage medium is shown to be a single medium, and the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

In some example embodiments, available reserve hardware devices are added to a network to add resources to this network. The addition of this hardware may force the owner of a network to incur additional costs. These costs arise from the costs associated with, in effect, renting the additional reserve hardware to increase the load balancing pool and resources associated therewith. For example, the longer the available reserve hardware is used, the greater costs. One way to limit these costs is to only use the available reserve hardware device for the period of time that it is needed. This available reserve hardware device may only be needed when the capacity of the load balancing pool to handle new users is exceeded.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer implemented method comprising: sending, to each device of a plurality of devices in a load balancing pool via a management interface of the device, a query; receiving, from each device via the management interface of the device, a response to the query comprising user count information that includes a user count value and an address identifier of the management interface of the device, the user count value indicating a number of users currently being served by the device; determining, by use of a processor, for each device, an identity of an external interface of the device corresponding to the received address identifier of the management interface of the device, the external interface of the device being employed to serve the users currently being served by the device; determining, for each device, a limit variable corresponding to the device based on the identity of the external interface of the device; and removing a device of the plurality of devices from the load balancing pool based on the user count value of the user count information for the device exceeding the limit variable corresponding to the device; reintroducing, to the load balancing pool, a second device of the plurality of devices that was previously removed from the load balancing pool for which the user count value for the second device is less than the entry value corresponding to the second device.

2. The computer implemented method of claim 1, wherein the address identifier of the management interface of the device is an Internet Protocol (IP) address corresponding to the management interface of the device.

3. The computer implemented method of claim 1, wherein the device is a server in the load balancing pool.

4. A computer implemented method comprising: sending, to each member of a plurality of members in a load balancing pool via a management interface of the member, a query; receiving, for each member of a plurality of members, user count information that includes a user count value for the member; determining, for each member of the plurality of members that is included in a load balancing pool, by use of a processor, whether the user count value for the member exceeds a limit variable corresponding to the member; removing, from the load balancing pool, a first member of the plurality of members included in the load balancing pool for which the user count value for the first member exceeds the limit variable corresponding to the first member; determining, for each member of the plurality of members that was previously removed from the load balancing pool, whether the user count value for the member is less than an entry value corresponding to the member, wherein the entry value is a numeric value that is less than the limit variable; and reintroducing, to the load balancing pool, a second member of the plurality of members that was previously removed from the load balancing pool for which the user count value for the second member is less than the entry value corresponding to the second member.

5. The computer implemented method of claim 4, wherein, for each member of the plurality of members, the limit variable corresponding to the member is defined as part of a license restriction covering the member, and reflects a number of users who may use the member concurrently.

6. The computer implemented method of claim 4, wherein each member of the plurality of members is a server.

7. The computer implemented method of claim 4, wherein the load balancing pool includes a plurality of servers that receive network traffic from a load balancing appliance.

8. The computer implemented method of claim 4, wherein, for each member, the user count value of the member is a numeric value representing a number of users using the member during a period of time.

9. A computer system comprising: a receiver configured to receive a script; a retriever configured to retrieve a current user count from a server; a scripting engine, comprising at least one processor, configured to execute the script to determine whether the current user count exceeds a limit variable described in a license restriction and to determine whether the current user count is less than an entry value, wherein the entry value is a numeric value that is less than the limit variable; and a load balance pool engine configured to determine whether to remove the server from a load balancing pool based on the server currently being a member of the load balancing pool and the current user count exceeding the limit variable, and configured to determine whether to add the server to the load balancing pool based on the server not currently being a member of the load balancing pool and the current user count being less than the entry value; wherein determining whether the current user count is less than an entry value includes, at least, sending, to each server of a plurality of servers in a load balancing pool via a management interface of the member, a query; and wherein the system is further configured to perform reintroducing, to the load balancing pool, a second server of the plurality of servers that was previously removed from the load balancing pool for which the user count value for the second server is less than the entry value corresponding to the second server.

10. The computer system of claim 9, wherein the computer system comprises a load balancing appliance that includes at least one from the group of: a Local Traffic Manager (LTM) appliance and a Global Traffic Manager (GTM) appliance.

11. The computer system of claim 10, wherein the server receives network traffic from the load balancing appliance.

12. The computer system of claim 9, wherein the limit variable is a numeric value that includes a number of users that may use the server concurrently.

13. A non-transitory machine-readable medium comprising instructions that, when implemented by one or more machines, cause the one or more machines to perform operations comprising: sending, to each member of a plurality of members in a load balancing pool via a management interface of the member, a query; receiving, for each member of a plurality of members, user count information that includes a user count value for the member; determining, for each member of the plurality of members included in a load balancing pool, whether the user count value for the member exceeds a limit variable corresponding to the member; removing, from the load balancing pool, a first member of the plurality of members included in the load balancing pool for which the user count value for the first member exceeds the limit variable corresponding to the first member; determining, for each member of the plurality of members that was previously removed from the load balancing pool, whether the user count value for the member is less than an entry value corresponding to the member, wherein the entry value is a numeric value that is less than the limit variable; and reintroducing, to the load balancing pool, a second member of the plurality of members that was previously removed from the load balancing pool for which the user count value for the second member is less than the entry value corresponding to the second member.

14. The computer implemented method of claim 1, further comprising:
  adding a second device not included in the load balancing pool to the load balancing pool based on the removing of the device of the plurality of devices from the load balancing pool.

15. The computer implemented method of claim 4, wherein removing, from the load balancing pool, the first member comprises:
  allowing the first member to serve current users after being removed from the load balancing pool; and
  preventing the first member from serving additional users after being removed from the load balancing pool.

16. The computer implemented method of claim 4, further comprising:
  adding a spare device to the load balancing pool in response to the removing of the first member from the load balancing pool.

17. The computer implemented method of claim 4, further comprising:
  removing a spare device from the load balancing pool in response to the reintroducing of the second member to the load balancing pool.

* * * * *